United States Patent [19]

Pitzmann

[11] 4,274,670

[45] Jun. 23, 1981

[54] PIVOTABLE HATCHBACK FOR A STREAMLINED REAR OF AN AUTOMOBILE

[75] Inventor: Gregor Pitzmann, Schwieberdingen, Fed. Rep. of Germany

[73] Assignee: Dr. Ing. h.c.F. Porsche Aktiengesellschaft, Stuttgart, Fed. Rep. of Germany

[21] Appl. No.: 37,845

[22] Filed: May 10, 1979

[30] Foreign Application Priority Data

May 10, 1978 [DE] Fed. Rep. of Germany ... 781407[U]

[51] Int. Cl.³ .................................................. B62D 35/00
[52] U.S. Cl. ........................................ 296/1 S; 296/91
[58] Field of Search .................... 296/1S, 91, 106, 50, 296/56

[56] References Cited

U.S. PATENT DOCUMENTS

| | | | |
|---|---|---|---|
| 3,059,562 | 10/1962 | Sturtevant | 296/91 |
| 3,181,911 | 5/1965 | Peras | 296/65 |
| 4,195,874 | 4/1980 | Janssen | 296/1 S |

*Primary Examiner*—John P. Silverstrim
*Assistant Examiner*—John A. Carroll
*Attorney, Agent, or Firm*—Craig and Antonelli

[57] ABSTRACT

A pivotal hatchback for a streamlined rear of an automobile, said hatchback comprising a glass pane, a frame circumferentially bordering said glass pane, and an aerodynamic drag reducing device provided in a rear area of hatchback, said device comprising an elastic body having a holding part, said body abutting the glass pane and frame with the holding part being fastened to the frame.

11 Claims, 2 Drawing Figures

PIVOTABLE HATCHBACK FOR A STREAMLINED REAR OF AN AUTOMOBILE

BACKGROUND AND SUMMARY OF THE INVENTION

The invention relates to a pivotable hatchback for a streamlined rear of an automobile, said hatchback comprising a glass pane and a frame with a stepwise cross section, the frame bordering said glass pane circumferentially.

In a known automobile (German Offenlegungsschrift No. 25 55 195) of the type cited hereinabove, the air stream separates relatively early from the rear area of the frame of the pivotable hatchback, whereby the drag coefficient of the vehicle is increased.

The goal of the invention is to provide devices on the pivotable hatchback to lower the drag coefficient of the vehicle, said devices not only being readily integrated into the hatchback, but also being attachable easily and reliably to said hatchback without significant structural modifications.

According to a preferred embodiment of the invention, this goal is achieved by virtue of the fact that an aerodynamic device (of a type known per se) is provided in the rear area of the hatchback, said device consisting of an elastic body with a holding part, whereby the body is supported with one wall section against the pane and the frame, and the holding part is fastened to the frame. It is advantageous in this connection for the holding part to be imbedded in the body and to be provided with a threaded bore, said bore cooperating with a threaded screw abutting the frame. The holding part is provided in the area of the threaded bore with a rib, said rib running parallel to and at a distance from a flange on the frame, with a section of the body extending between the rib and the flange. The wall section abuts the pane with a local shoulder and a lip which constitutes the border of said shoulder. The cross sectional shape of the body of the device is substantially the shape of an acute triangle, said triangle constituting an extension of the hatchback, whereby the upper surface of the body meets the horizontal at an acute angle, in such manner that is rises opposite to the forward direction of travel. The body has a bead at its free end that is generally trapezoidal in cross section, and projects above the upper surface, the rear delimiting section of said bead running vertically. Moreover, the body extends over the width of the hatchback, is pulled around the corners of the latter, and tapers off at its lateral frame parts.

The advantages which are especially offered by the invention include the fact that the drag coefficient of the aerodynamically designed vehicle is further improved. The aerodynamic device is integrated in the pivotable hatchback, and without any significant structural modifications having to be made in the latter. The arrangement and design of the device permit the latter to be fastened simply and reliably to the hatchback.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
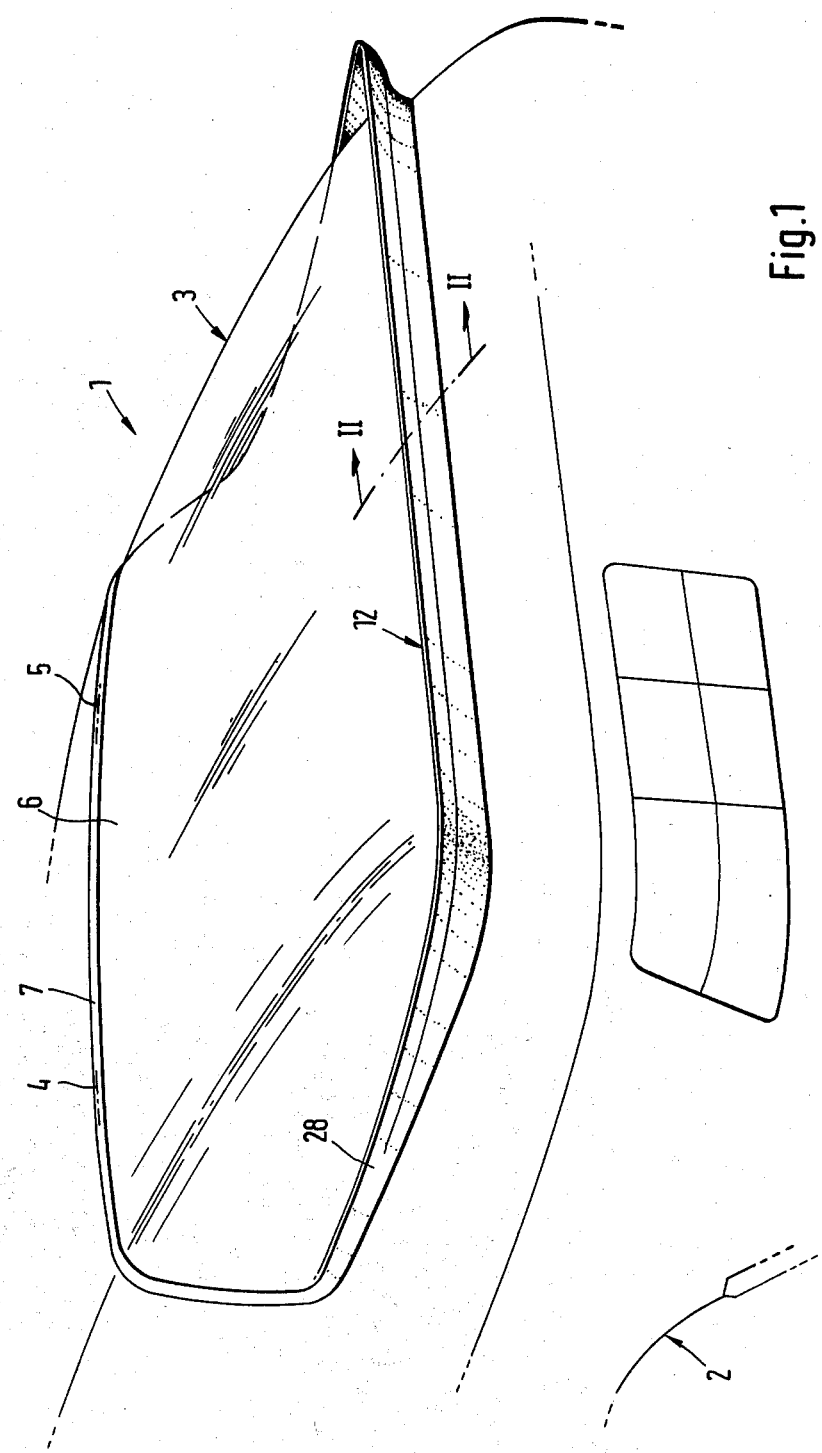
FIG. 1 is a three-quarters view of a rear of an automobile with the preferred embodiment of a pivotable hatchback structed in accordance with the invention.
Figure 2:
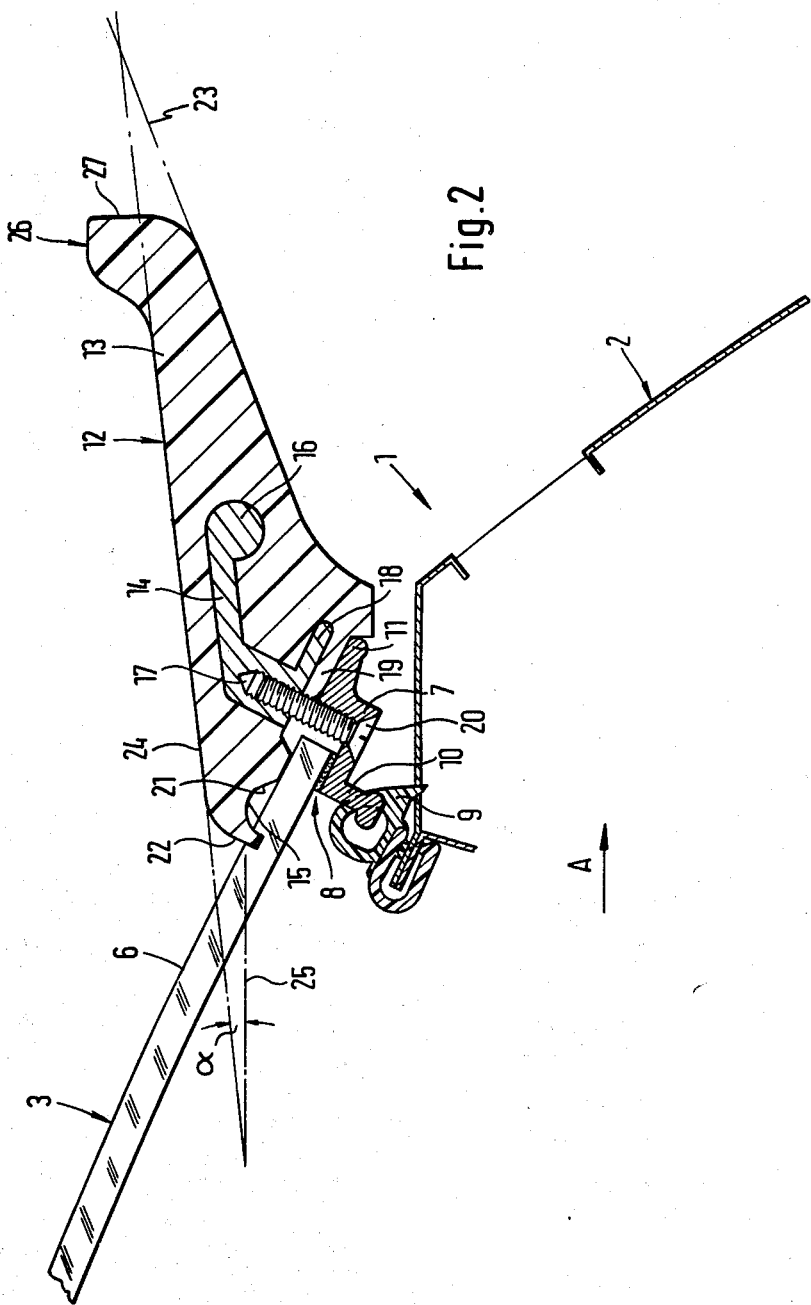
FIG. 2 is a cross sectional view taken along line II—II in FIG. 1 on an enlarged scale.

Automobile 1, in the area shown, comprises a body 2 with a pivotable hatchback 3, said hatchback being pivoted on concealed hinges 4, 5. Hatchback 3 consists of a glass pane 6 and a frame 7. Frame 7 delimits the glass pane 6 circumferentially and is constituted by a section with a stepwise cross-section, whereby the pane and the frame are joined at 8 by a surface adhesive. In addition, frame 7 comprises an edge 10 which cooperates with a sealing body 9 and a flange 11, which constitutes an extension of pane 6 and runs in the same plane as the latter.

An aerodynamic device 12 is disposed in the rearward part a hatchback 3, for reducing the drag coefficient of the automobile. Device 12 is formed by an elastic body 13 made of polyurethane foam and a holding part 14 made of metal. Body 13 abuts pane 6 and frame 7 with a wall section 15, and is fastened to the frame. Holding part 14 has an angular shape, whereby the end area is provided with a thickened portion 16.

Furthermore, holding part 14 includes a threaded bore 17, and is embedded in body 13, as a result of foaming therearound. A rib 18, running parallel to and at a distance from flange 11 of frame 7, extends next to threaded bore 17. A section 19 of body 13 extends between flange 11 and rib 18 and acts to securely retain the holding part 14 within the body 13.

A threaded screw 20, which abuts frame 7, serves to hold holder 14 and/or device 12.

Wall section 15 of body 13 abuts glass pane 6 with a local shoulder 21 and a lip 22. The lip 22 functions to produce, through the entire width of body 13, an initial stress or lead between the glass 6 and body 13 and an exact fit of the body 13 against the glass. Without such a lip 22 (i.e., in an arrangement merely utilizing a shoulder 21 having a planar engagement surface contacting the glass) the risk arises that the shoulder 21 will not match the exact contours of the glass 6 across the entire extent and spaces or splits between the glass 6 and shoulder 21, will exist at the exterior edge of the shoulder 21.

The cross-section of body 13 is formed by an acute triangle 23, which constitutes an extension of hatchback 3. The upper side 24 of body 13 forms an acute angle α with a horizontal plane 25, in such a manner that it slopes against the direction of travel A.

For rearward delimitation, body 13 is provided with a bead 26 which is trapezoidal in cross-section, said bead projecting above upper surface 24. Delimiting section 27 is approximately vertical thereto.

Finally, body 13 extends over the width of hatchback 3, continues around the rounded corners of hatchback 13 and tapers off along forwardly extending lateral frame parts 28.

While I have shown and described one embodiment in accordance with the present invention, it is understood that the same is not limited thereto, but is susceptible of numerous changes and modifications as known to those skilled in the art and I therefore do not wish to be limited to the details shown and described herein but intend to cover all such changes and modifications as are encompassed by the scope of the appended claims.

I claim:

1. A pivotal hatchback for a streamlined rear of an automobile, said hatchback comprising a glass pane, a frame circumferentially bordering said glass pane, and an aerodynamic drag reducing device provided in a rear area of hatchback, said device comprising an elastic body having a holding part, said body abutting the glass pane and frame with the holding part being fastened to the frame, wherein the aerodynamic drag reducing device is held on said glass plane in cooperation with said frame at at least a lower edge of the glass pane.

2. A pivotal hatchback according to claim 1, wherein said frame has a stepped cross-section.

3. A pivotable hatchback for a streamlined rear of an automobile, said hatchback comprising a glass pane, a frame circumferentially bordering said glass pane, and an aerodynamic drag reducing device provided in a rear area of hatchback, said device comprising an elastic body having a holding part, said body abutting the glass pane and frame with the holding part being fastened to the frame, wherein said holder is embedded in the body and has a threaded bore therein, said bore cooperating with a threaded screw associated with the frame.

4. A pivotable hatchback according to claim 3, wherein the holder is provided with a rib in the vicinity of said threaded bore, said rib running approximately parallel to and at a distance from a flange of the frame, and with a section of the body extending between the rib and the flange.

5. A pivotable hatchback for a streamlined rear of an automobile, said hatchback comprising a glass pane, a frame circumferentially bordering said glass pane, and an aerodynamic drag reducing device provided in a rear area of hatchback, said device comprising an elastic body having a holding part, said body abutting the glass pane and frame with the holding part being fastened to the frame, characterized by the fact that a wall section of the device abuts the glass pane with a local shoulder and a lip, said lip formming a boundary of said shoulder.

6. A pivotal hatchback for a streamlined rear of an automobile, said hatchback comprising a glass pane, a frame circumferentially bordering said glass pane, and an aerodynamic drag reducing device provided in a rear area of hatchback, said device comprising an elastic body having a holding part, said body abutting the glass pane and frame with the holding part being fastened to the frame, characterized by the fact that the cross sectional shape of the body of the device is in substantial part an acute triangle, said triangle constituting an extension of the hatchback, whereby an upper surface of the body, in use, forms an acute angle with respect to a horizontal intersecting plane, said upper surface sloping upwardly in a rearward direction.

7. A pivotable hatchback according to claim 6, characterized by the fact that said body has a bead at a free end thereof, said bead projecting above the upper surface, being generally trapezoidal in cross-section and having a rearwardly directed surface, in use, extending vertically in a closed position of said hatchback.

8. A pivotable hatchback according to claim 6, wherein the body extends across the width of the hatchback and continues around the corners of the hatchback and tapers along forwardly extending lateral parts of the frame.

9. A pivotal hatchback for a streamlined rear of an automobile, said hatchback comprising a glass pane, a frame circumferentially bordering said glass pane, and an aerodynamic drag reducing device provided in a rear area of hatchback, said device comprising an elastic body having a holding part, said body abutting the glass pane and frame with the holding part being fastened to the frame, wherein said frame has a stepped cross-section, a first step of said stepped cross-section being connected to a first surface of said glass pane of said holding part being fastened to a second step of said stepped cross-section with said elastic body contacting a surface of the glass pane opposite to said first surface.

10. A pivotal hatchback for a streamlined rear of an automobile, said hatchback comprising a glass pane, a frame circumferentially bordering said glass pane, and an aerodynamic drag reducing device provided in a rear section of the hatchback, said device comprising an elastic body extending across the width of the hatchback and continuing around the corners of the hatchback and tapering along forwardly extending lateral parts of the frame.

11. A pivotal hatchback according to claim 10, wherein the aerodynamic drag reducing device is held on said glass pane in cooperation with said frame at at least a lower edge of the glass pane.

* * * * *